United States Patent
Chomakov et al.

(10) Patent No.: US 11,941,406 B2
(45) Date of Patent: Mar. 26, 2024

(54) INFRASTRUCTURE (HCI) CLUSTER USING CENTRALIZED WORKFLOWS

(71) Applicant: VMware, Inc., Palo Alto, CA (US)

(72) Inventors: Vasil Chomakov, Sofia (BG); Martin Marinov, Sofia (BG); Branislav Abadzhimarinov, Sofia (BG); Vikram Krishnamurthy, Milpitas, CA (US)

(73) Assignee: VMware, Inc., Palo Alto, CA (US)

( * ) Notice: Subject to any disclaimer, the term of this patent is extended or adjusted under 35 U.S.C. 154(b) by 277 days.

(21) Appl. No.: 16/587,043

(22) Filed: Sep. 29, 2019

(65) Prior Publication Data

US 2021/0096878 A1 Apr. 1, 2021

(51) Int. Cl.
*G06F 9/38* (2018.01)
*G06F 8/71* (2018.01)
*G06F 9/445* (2018.01)
*G06F 9/50* (2006.01)

(52) U.S. Cl.
CPC .............. *G06F 9/3891* (2013.01); *G06F 8/71* (2013.01); *G06F 9/44505* (2013.01); *G06F 9/5027* (2013.01)

(58) Field of Classification Search
CPC .............. G06F 2009/45579; G06F 8/71; G06F 9/3891; G06F 9/44505; G06F 9/45558; G06F 9/5027
See application file for complete search history.

(56) References Cited

U.S. PATENT DOCUMENTS

| 9,563,478 | B1* | 2/2017 | Miller | G06F 9/485 |
| 2004/0010665 | A1* | 1/2004 | Agarwal | G06Q 10/10 |
| | | | | 711/156 |
| 2007/0083588 | A1* | 4/2007 | Keller | G06F 9/5077 |
| | | | | 709/202 |
| 2009/0031012 | A1* | 1/2009 | Johnson | H04L 12/66 |
| | | | | 709/222 |
| 2011/0179371 | A1* | 7/2011 | Kopycinski | G06Q 10/10 |
| | | | | 715/772 |

(Continued)

OTHER PUBLICATIONS

Jeff Hunter, "Faster, Consistent HCI Deployment with Cluster QuickStart", VMware Blogs, Oct. 4, 2018, Retrieved from the Internet at<URL. blogs.vmware.com/virtualblocks/2018/10/04/faster-consistent-hci-deployment-with-cluster-quickstart/.

*Primary Examiner* — Jorge A Chu Joy-Davila
(74) *Attorney, Agent, or Firm* — King Intellectual Asset Management

(57) ABSTRACT

Example methods are provided for configuring a hyper-converged infrastructure (HCI) cluster managed by a cluster manager. The method may comprise retrieving, by a workflow session from the cluster manager. The workflow session may include a plurality of workflow operations, and a first workflow operation selected from the plurality of workflow operations is marked as incomplete. The method may transmit o the cluster manager a request to invoke the first workflow operation. The cluster manager may be configured to perform the first workflow operation by batch-configuring a plurality of nodes in the HCI cluster. In response to a determination that the first workflow operation is completed, the method may request the cluster manager to mark the first work operation in the workflow session as completed.

17 Claims, 3 Drawing Sheets

(56) References Cited

U.S. PATENT DOCUMENTS

| | | | |
|---|---|---|---|
| 2012/0011511 A1* | 1/2012 | Horvitz | G06F 9/4806 |
| | | | 718/100 |
| 2016/0028587 A1* | 1/2016 | Garg | H04L 67/1002 |
| | | | 709/224 |
| 2016/0072899 A1* | 3/2016 | Tung | H04L 41/145 |
| | | | 709/223 |
| 2017/0134519 A1* | 5/2017 | Chen | H04L 67/60 |
| 2018/0143854 A1* | 5/2018 | Kumar | G06F 9/505 |
| 2018/0145955 A1* | 5/2018 | Nirwal | H04L 63/068 |
| 2018/0164965 A1* | 6/2018 | Chen | G06F 9/451 |
| 2020/0192651 A1* | 6/2020 | Mudumbai | H04L 41/14 |
| 2020/0244545 A1* | 7/2020 | Chaganti | H04L 41/22 |
| 2020/0250153 A1* | 8/2020 | Krivenok | G06F 16/256 |

\* cited by examiner

INFRASTRUCTURE (HCI) CLUSTER USING CENTRALIZED WORKFLOWS

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. Further, through storage virtualization, storage resources of a cluster of hosts may be aggregated to form a single shared pool of storage. The shared pool is accessible by virtual machines supported by the hosts within the cluster. In practice, however, configuration of the cluster of hosts could be a tedious process that takes up a lot of time and effort.

DETAILED DESCRIPTION

Figure 1:
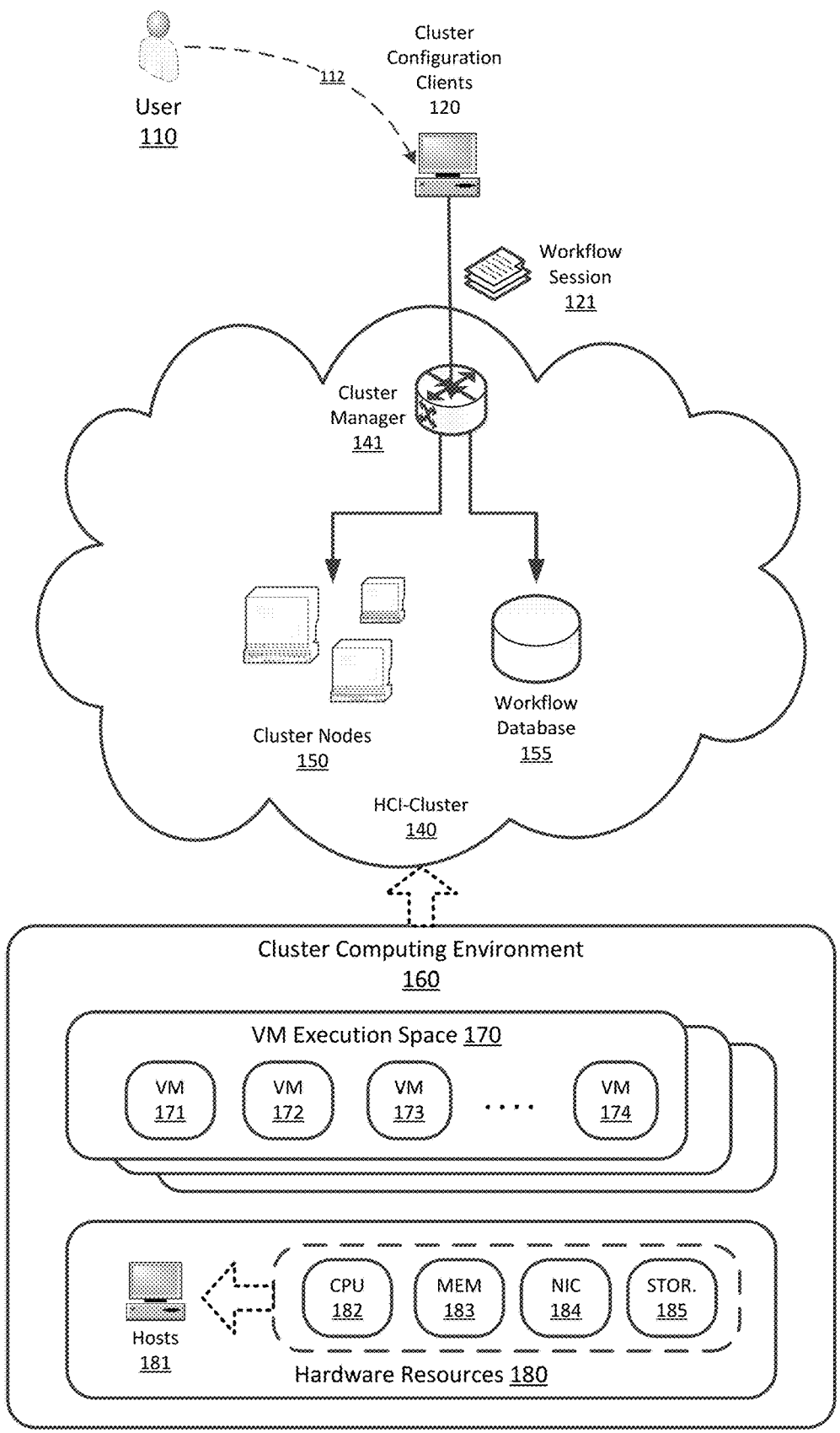
FIG. 1 is a schematic diagram illustrating a system configured to provide configuration of a hyper-converged infrastructure (HCI) cluster

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The present disclosure relates to the configuration of multiple cluster nodes in a hyper-converged infrastructure (HCI) cluster using centralized workflows. Specifically, the present disclosure allows a single workflow session to be invoked by multiple configuration clients. In addition, each workflow operation in the workflow may perform batch-configuring of the multiple cluster nodes in the HCI cluster. Such an approach may greatly simplify the task of configuring the HCI cluster.

FIG. 1 illustrates a block diagram of a system configured to provide configuration of a HCI cluster, according to one or more embodiments of the present disclosure. In FIG. 1, the system may include a computer cluster 140 which may be implemented based on a cluster computing environment 160. Administrators/users 110 of the system may utilize multiple cluster configuration clients 120 to configure the computer cluster 140. Each of the cluster configuration clients 120 may be configured to interact with a cluster configuration manager 141 to perform various configuration tasks on the computer cluster 140. In some embodiments, the cluster configuration clients 120 may be any computers or devices that can communicate with the HCI cluster 140 via network communications, and can display graphic user interface (GUI) applications for the users 110.

In some embodiments, the computer cluster 140 may include a set of computer nodes 150 loosely or tightly connected via a cluster network. Each of the computer nodes 150 may be referred to as a "cluster node", "virtualized node", "host", or "node." Further, each cluster node 150 may be a computing device or an electronic device capable of operating jointly or independently. For example, a cluster node 150 may be a personal computer, a server computer, a smartphone, a consumer device such as television, a vehicle control device installed on a car, or any other device that has computational and networking capabilities.

In some embodiments, the cluster nodes 150 in the computer cluster 140 may be integrated together so that they can be viewed as a single system from an external perspective. The cluster nodes 150 may be connected to one or more cluster networks, so that one cluster node 150 may be able to directly or indirectly communicate with any other cluster nodes 150 in the computer cluster 140. The cluster network may be implemented using one or more network communication protocols that allow network messages to be broadcasted, relayed, and otherwise delivered, and may be an Ethernet, Local Talk, Straight Bus, FDDI Ring, Token Ring, ATM, Star Network, or peer-to-peer network. Multiple cluster nodes 150 may be deployed with redundancy, fault-tolerance, or failover capabilities, in order to improve performance and availability over that of a single computer. Thus, the computer cluster 140 may have a wide range of applicability and deployment, ranging from small business clusters with a handful of nodes to supercomputers within hundred-thousand of nodes.

In some embodiments, the computer cluster 140 may be implemented as a HCI cluster 140, and the cluster nodes 150 may be implemented as virtualized nodes. HCI may be a software-defined IT infrastructure that virtualizes all of the elements of conventional "hardware-defined" systems. Specifically, HCI may include, among other components and features, virtualized computing (a hypervisor), a virtualized SAN (software-defined storage), and virtualized networking (software-defined networking). In HCI, both the storage area network and the underlying storage abstractions are implemented virtually in software (at or via the hypervisor) rather than physically in hardware. Because all of the software-defined elements are implemented within the context of the hypervisor, management of all resources may be be federated across all instances of a hyper-converged infrastructure.

In some embodiments, the HCI cluster 140 may contain a cluster manager 141 to configure and support the HCI components such as storage virtualization, compute virtualization, and management, etc. The cluster manager 141 may be implemented in one of the cluster nodes 150, or may be a separate system communicating with the cluster nodes 150 via the cluster network. The cluster manager 141 may configure the HCI cluster 140 based on policies aligned with the applications for the HCI cluster 140, thereby eliminating the need for complicated constructs like LUNs and volumes. The cluster manager 141 may also utilize advanced management features such as centralized workflows and batch-configuring to further reduce manual tasks and help automate configuration operations.

For example, the cluster manager 141 may perform the various configuration operations initiated from the cluster configuration clients 120. Specifically, the cluster manager 141 may communicate with the cluster configuration clients 120 as well as with each of the cluster nodes 150 via the cluster network. The cluster manager 141 may monitor the status of the cluster nodes 150 and may further create, adjust, and configure these cluster nodes 150. In some embodiments, the cluster manager 141 may be implemented using VMWare® vCenter.

In some embodiments, the user 110 may utilize multiple cluster configuration clients 120 to interact with the cluster manager 141 and configure the HCI cluster 140. Conventionally, creating complex infrastructure configurations such as an HCI Cluster may require a lot of information gathering (from multiple systems) and multiple operations on multiple parts of the system (e.g. install/upgrade nodes) and ultimately can be achieved by multiple users 110. Thus, the configuration of a HCI cluster 140 based on a virtualized cluster computing environment 160 may be a tedious and repetitive process.

For example, to configure a distributed storage system for the HCI cluster 140, a user 110 (e.g., network administrator) generally has to utilize a configuration application to navigate through a series of dialogs and/or wizards to enable or disable various features. The configuration is usually performed in a serial manner, which means that the user 110 must wait for some features to be configured before being allowed to start on the next. Such configuration process takes up a lot of time and effort, and lacks efficiency.

In some embodiments, the cluster manager 141 may utilize a cluster configuration workflow to manage and automate these complicated and repetitive configuration operations. A "workflow" may define a set of workflow operations and a workflow order to execute these workflow operations, for the purpose of organizing and managing the various operations associated with a certain goal (e.g., configuring a HCI cluster 140). Each "workflow operation" in a workflow may be one or more distinctive tasks, steps, and actions that can be performed either manually via a user invocation, or automatically under the cluster manager 141. The "workflow order" may dictate a sequence to execute these workflow operations in the workflow. For example, the workflow order may indicate that a first workflow operation and a second workflow operation may have a "sequential/dependency" order, meaning the first workflow operation needs to be completed before the second workflow operation is performed. In other cases, two workflow operations in a workflow may not have any dependency order, meaning these two workflow operations may be performed in any order or in-parallel (concurrently).

In some embodiments, a "workflow session" may be used to store/record the transitional state or progress of a workflow when being executed. A workflow session may be created based on a specific workflow, and may contain the same set of workflow operations and workflow order as defined in the specific workflow. When a workflow session is initially created, all of the workflow operations contained therein may be marked as "Incomplete", indicating that these workflow operations in this particular workflow session are yet to be performed. During subsequent operations, after some of the workflow operations are performed in accordance to workflow order as defined in the workflow session, the cluster manager 141 may mark the completed workflow operations as "completed." Thus, a newly created or unprocessed workflow session may have all of its workflow operations marked as "incomplete." A workflow session in the middle of processing may have some of its workflow operations marked as "completed", and the rest of its workflow operations marked as "incomplete." And a finished workflow session may have all of its workflow operations marked as "completed."

In some embodiments, multiple workflow sessions may be created based on a single specific workflow. In this case, each workflow session may be used to record the distinctive advancement of a particular execution of the workflow operations. For example, a workflow may be defined to install a set of software on a cluster node 150. Users 110 may access multiple cluster configuration clients 120 to initiate multiple of these workflow sessions based on this workflow, with each workflow session being assigned to track the progress of installing the software on a particular cluster node 150. In this case, these workflow sessions may be used to initiate software installation operations (and record the statuses of these software installations) on their respective cluster nodes 150. Conventionally, these workflow sessions may be stored on the respective cluster configuration clients 120 which initiated them. Under such an approach, a separate user 110 operating from a second cluster configuration client 120 may not be able to view and control a workflow session that is initiated from a first cluster configuration client 120. Further, a user 110 must have access to a particular cluster configuration client 120 in order to invoke the workflow session 121 (or invoke a specific workflow operation in the workflow session 121) stored in that cluster configuration client 120.

In some embodiments, the cluster manager 141 may store the workflows and their associated workflow sessions in a workflow database 155 that is located in the HCI cluster 140 as shown in FIG. 1. The workflow database 155 may be any persistent data storage such as a relational database management system (RDBMS) or a file located in the HCI cluster 140. Alternatively, the workflow database 155 may reside outside of the HCI cluster 140. A cluster configuration client 120 may create and initiate a new workflow session that will be stored in the workflow database 155. Likewise, a cluster configuration client 120 may retrieve from the workflow database 155 an ongoing or unfinished workflow session that has been initiated by the same or a separate cluster configuration client 120, and continue to perform those workflow operations that are marked "incomplete." Under this centralized approach, the workflow sessions are no longer stored in any of the cluster configuration clients 120. Rather, any and all workflows or workflow sessions may be stored in the centralized workflow database 155. And one or multiple of the cluster configuration clients 120 may access and participate in the processing of a single workflow session 121.

For example, a cluster configuration client 120 (e.g., "first client") may construct based on a specific cluster configuration workflow a workflow session 121 to be stored in the workflow database 155. The first client 120 may then display the newly constructed workflow session 121 on its GUI screen for user 110's inspection and review. Afterward, the user 110 may commit the workflow session 121 to the workflow database 155 by invoking a UI operation (e.g., by clicking on a "save" button) on the first client 120. Based on this user request, the first client 120 may interact with the cluster manager 141 to store the workflow session 121 in the workflow database 155.

In some embodiments, based on user 110's subsequent requests, the first client 120 may communicate with the cluster manager 141 to invoke the workflow operations in this workflow session 121. In this case, the cluster configuration manager 141 may perform each of the workflow operations in the workflow session 121 based on the workflow order contained therein, and return corresponding status messages back to the first client 120. After completing one of the workflow operations, the cluster manager 141 may update the workflow session 121 stored in the workflow database 155 with marking of the completed workflow operation as "completed." Afterward, the cluster manager 141 may select the subsequent workflow operations based on the workflow order, and continue to perform these "incomplete" workflow operations until the whole workflow session 121 is processed.

In some embodiments, another cluster configuration client 120 (e.g., "second client") may retrieve an existing workflow session 121 stored in the HCI cluster 140, and perform any one of the "incomplete" workflow operations contained therein. For example, the second client 120 may interact with the cluster manager 141 to retrieve a set of existing workflow sessions 121 stored in the workflow database 155, and select one of the retrieved workflow sessions 121 for further review. This retrieved workflow sessions 121 may have been created and processed by the first client 120, or may be previously processed by the second client 120 itself. Afterward, the second client 120 may invoke one of the incomplete workflow operations for further processing.

In some embodiments, multiple users 110 may be in charge of configuring different aspects of the HCI cluster 140. In this case, these multiple users 110 may utilize different cluster configuration clients 120 to work on a single workflow session 121. For example, the single workflow session 121 may contain two independent workflow operations (e.g., first workflow operation and second workflow operation with no dependencies between each other). In this case, one user 110 may utilize one cluster configuration client 120 to invoke the first workflow operation of the workflow session 121, and another user 110 may utilize a second cluster configuration client 120 to simultaneously invoke the second workflow operation.

In some embodiments, a user may need to execute multiple workflow sessions on multiple cluster nodes 150 to configure an identical aspect of the cluster nodes 150. For example, for a HCI cluster 140 that uses VMWARE's vSphere® to implement the cluster nodes 150, setting-up the network for these cluster nodes 150 may require performing on each of the cluster nodes 150 a number of separate and distinctive operations, such as: creating distributed switch(es); creating distributed port groups; adding nodes to distributed switch(es); create VMkernel network adapters on each node for different kinds of system traffic (vMotion, management, vSAN); assigning VMkernel adapters to distributed port groups, etc. The above process may be lengthy and contain multiple manual steps that are error prone and time-consuming, all of which might result in an inconsistent network configuration among cluster nodes 150 in the HCI cluster 140.

In some embodiments, rather than performing the above operations for each cluster node 150, the cluster manager 141 may create workflow with workflow operations that can perform batch-configuring of multiple cluster nodes 150. Specifically, "batch-configuring" may refer to a configuration operation that can be applied to multiple cluster nodes 150 either simultaneously or sequentially. During batch-configuring, with a single invocation of a specific workflow operation, by the cluster configuration client 120, the cluster configuration manager 141 may automatically perform this specific workflow operation on each of the multiple cluster nodes 150, thereby freeing the user 110 from repeating this single workflow operation on these cluster nodes 150 one-at-a-time.

For example, after creating the cluster nodes 150 in the HCI cluster 140, the cluster manager 141 may configure the cluster nodes 150 networks with different IP addresses. When the cluster manager 141 does not support batch-configuring, the user 110 may need to create multiple workflow sessions each if which including a "network configuration" workflow operation that may require manual input of a unique IP address. The user 110 may then need to invoke these "network configuration" workflow operations on each cluster node 150, in order to set up the unique IP address for this cluster node. In comparison, when the "network configuration" workflow operation is batch-configuring enabled, the user 110 may only create one workflow session 121, and invoke a single "network configuration" workflow operation contained therein. In response to this single invocation, the cluster manager 140 may batch-process this network configuration workflow operation and configure the networks for all the cluster nodes 150' without requiring user 110's further involvement. Thus, the above approach may enable users to efficiently configure multiple cluster nodes in a HCI cluster by using centralized workflow sessions and by implementing batch-configuration capability to the cluster configuration manager 141.

In some embodiments, the HCI cluster 140 may be constructed using a virtualized cluster computing environment 160. The cluster computing environment 160 may include one or more virtual machine execution space 170, each of which containing multiple VMs 171, 172, 173, and 174 configured to host various applications. Further, the cluster computing environment 160 may include a cluster manager implemented based on a VMWARE VSPHERE server or VSAN cluster. The virtual machine execution space 170 may be implemented using hypervisor (such as VMware ESX® based hypervisor, or Microsoft® Hyper-V® virtualization, all of which are not shown in FIG. 1) to create the VMs 171-174 based on the hardware resources 180. The hardware resources 180 may include one or more hosts 181, each of which may be a physical computer system having a "physical hardware platform" (e.g., an x86 architecture platform). The hypervisor may be configured to construct a "virtual hardware platform" for the VMs 171-174 based on the host 181's physical hardware platform.

In some embodiments, to support the physical hardware platform, the hardware resources 180 may include various "physical hardware components" such as, without limitation, one or more physical Central Processing Units (CPUs) 182, physical memory 183, physical Network Interface Card (NIC) 184, physical storage (e.g., hard drive) 185, and/or additional electronic circuit components (all of which may be supplied by one or more hosts 181). Each of CPU(s) 182 may be configured to execute instructions that perform one or more operations described herein. The instructions can be stored in the memory 183, storage 185, or any other memory in the hosts 181 (e.g., cache memory) that, when executed by the CPU 182, cause the CPU 182 to perform certain operations as described herein.

In some embodiments, the memory 183 may be non-transitory storage medium configured to store various information, and may include, e.g., random access memory (RAM), read-only memory (ROM), or a combination thereof. The NIC 184 may include one or more network adapters. And the storage 185 may include local storage devices, such as hard disks, flash memory modules, solid state disks, optical disks, and the like. Storage 185 can also include interface(s) configured for communication with one or more network data storage systems, such as host bus adapter(s) configured for communication with a storage array network (SAN) or network-attached storage (NAS), as well as other network data storage systems.

In some embodiments, based on the hardware resources 180, the VM manager (or hypervisor) may configure a "virtual hardware platform" for the VMs 171-174 with one or more "virtual hardware components" such as, without limitation, one or more virtual CPUs, virtual memory, virtual storage, virtual NIC, and/or additional virtual components (not shown in FIG. 1). With helps from the VM manager, the virtual hardware components may emulate the behaviors and the computing capabilities of the corresponding physical hardware components, thereby allowing the VMs 171-174 to function as if they were physical hosts 181. The cluster computing environment 160 may include additional and/or alternative components than that shown in FIG. 1.

In some embodiments, the cluster manager 141 may implement the HCI storage virtualization by aggregating the storage resources in the cluster computing environment 160 into a shared pool of storage resources. The cluster manager 141 may employ any suitable technology, such as Virtual Storage Area Network (VSAN) from VMWARE®. In some embodiments, the cluster manager 141 may configure the HCI cluster 140 as a distributed resource scheduler (DRS) cluster, which manages and supports cluster-wide resource pools and enforces cluster-level resource allocation policies relating to load balancing, power management, high availability, virtual machine placement, etc.

In some embodiments, the cluster manager 141 may implement the HCI network virtualization by provisioning software-defined networks (SDNs) without having to reconfigure the underlying physical hardware. Further, the cluster manager 141 may segment the network of a data center into distinct network segments using software, such as by deploying virtual network(s) on top of the physical network.

In some embodiments, the techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable-gate arrays (FPGAs), and others. The term 'processor' is to be interpreted broadly to include a processing unit, ASIC, logic unit, or programmable gate array etc. For example, the cluster manager 141 (and the various modules contained therein) may be implemented using a FPGA or a network-enabled hardware module installed in a cluster node 150 and allows external network communications.

Figure 2:
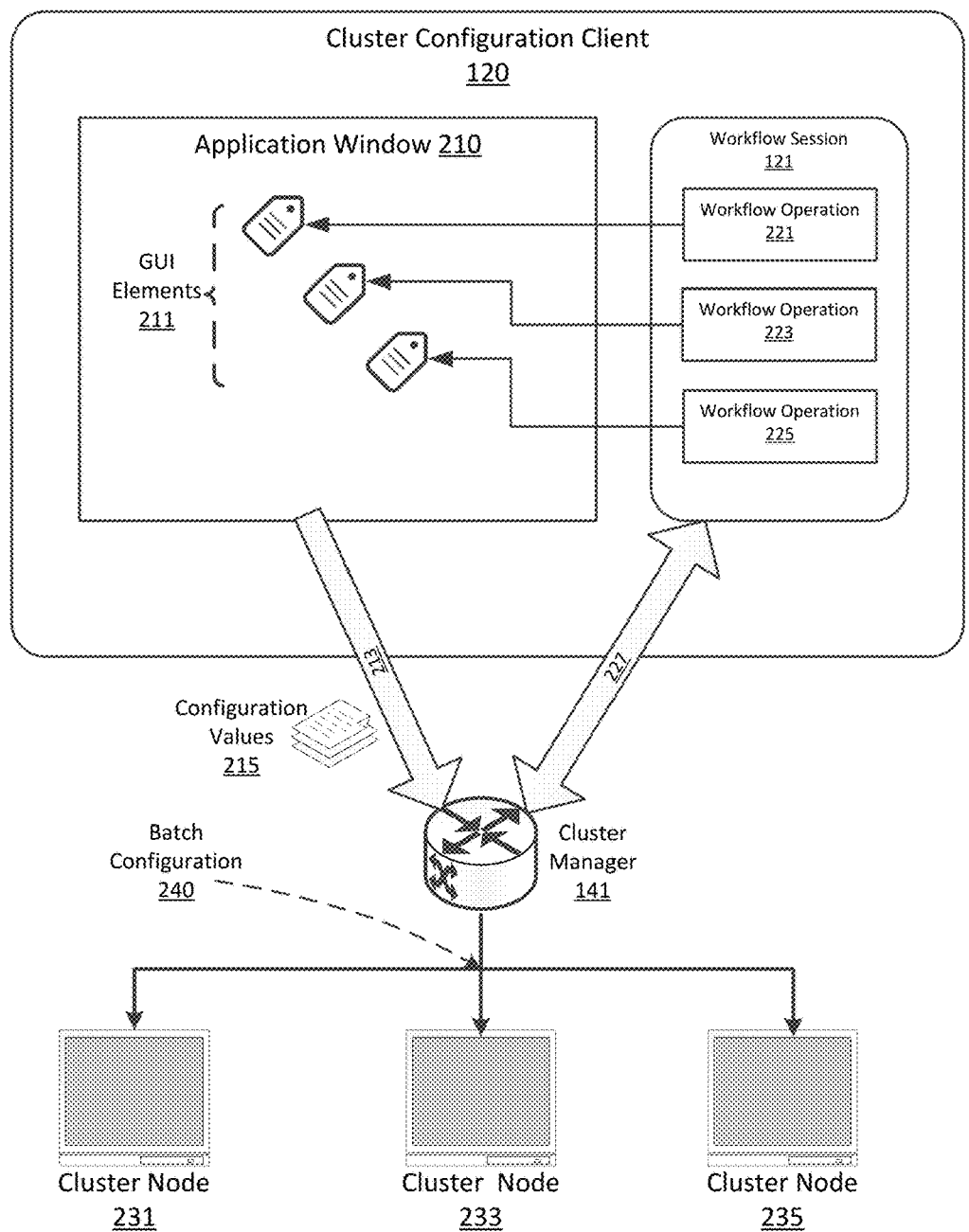
FIG. 2 illustrates a cluster configuration client using an application window to perform HCI cluster configuration.

FIG. 2 illustrates a cluster configuration client using an application window to perform HCI cluster configuration, according to one or more embodiments of the present disclosure. In FIG. 2, various systems, windows, components, and modules may correspond to their respective counterparts in FIG. 1.

In some embodiments, a cluster configuration client 120 may utilize an application window 210 with graphic user interface (GUI) elements 211 to interact with a cluster manager 141, and to configure multiple cluster nodes 231, 233, and 235 in a HCI cluster (not shown in FIG. 2). Specifically, the cluster configuration client 120 may interact with the cluster configuration manager 141 to create a workflow session 121, which contains multiple workflow operations 221, 222, and 223. After being reviewed by a user, the cluster configuration client 120 may transmit (227) the newly created workflow session 121 to the cluster manager 141, which may in turn store the workflow session 121 into a workflow database for centralized management. Subsequently, the cluster configuration client 120 may retrieve (227) the workflow session 121 from the workflow database via the cluster manager 141.

In some embodiments, the cluster configuration client 120 may instantiate an application window 210 to display the workflow operations 221, 223, and 225 in the workflow session 121 as GUI elements 211 in the application window 210. Specifically, a "GUI element" may refer to any graphic element that can be displayed on the application window 210. Examples of GUI elements may include text boxes, input field, drop-down list, button, menu, etc. Some GUI elements may provide a user interaction interface, through which a user may provide user inputs via keyboard or mouse. For example, a user may select one of the multiple choices provided by a drop-down list, and the selected choice may be deemed a user input.

In some embodiments, the GUI elements 211 may display the details of the workflow operations 221, 223, and 225, and may show whether these workflow operations 221, 223, and 225 are incomplete or completed. For the incomplete workflow operations, their associated GUI elements 211 may have additional input options (e.g., input fields) that allow a user to manually input configuration values. Further, the application window 210 may display the GUI elements 211, which are associated with those incomplete workflow operations that can be invoked at this moment, with additional activation/invocation mechanism (e.g., a button). In this case, a user may quickly identify these specific GUI elements 211 that can be invoked, and can generate an invocation of the associated workflow operations by clicking on the invocation/activation mechanism on the GUI elements.

In some embodiments, after the user invokes a specific GUI element 211, the application window 210 may transmit (213) the user's invocation to the cluster manager 141, which may in turn invoke the workflow operation associated with the specific GUI element 211. If the workflow operation is performed successfully, the cluster manager 141 may set the workflow operation to be "completed" in the workflow session 121, store the workflow session 121 in the workflow database, and return status information back to the application window 210. The application window 210 may then adjust its display of GUI Elements 211 accordingly, and highlight the rest of workflow operations that are incomplete and ready for invocation.

In some embodiments, another cluster configuration client 120 may interact with the cluster configuration manager 141 to retrieve (227) from the workflow database the same workflow session 121 that has been previous worked on, and display the workflow operations 221, 223 and 225 in its application window 210. A separate user may utilize this cluster configuration client 120 to invoke a subsequent workflow operation in the workflow session 121 using the similar approach as described above. Further, multiple concurrent workflow operations may be parallel invoked and performed by different cluster configuration clients 120, with one cluster configuration client 120 performing one of the concurrent workflow operation, while a separate cluster configuration client 120 performing the another one of the concurrent operations.

In some embodiments, a single workflow operation may have multiple steps/actions that can be sequentially or concurrently performed by multiple cluster configuration clients 120. In this case, one cluster configuration client 120 may perform some of the steps/actions in this workflow operation, with a separate cluster configuration client 120 invoking the rest of steps/actions in this workflow operation. Alternatively, when one cluster configuration client 120 unsuccessfully performed some of the steps/actions in a workflow operation, the workflow operation is not marked as "completed". In this case, a separate cluster configuration client 120 may repeat this workflow operation and retry the failed steps/actions.

In some embodiments, the cluster manager 141 may perform a batch-configuration 240 of the cluster nodes based on a single workflow operation. In other words, the cluster manager 141 may perform the single workflow operation on each one of the cluster nodes 231, 233, and 235. For example, a "create-node" workflow operation displayed in the application window 210 may allow a user to configure how many cluster nodes to be created in the HCI cluster, as well as to input optional configuration values such as names of the cluster nodes to be created. Once this "create-node" workflow operation is invoked by a cluster configuration client 120, the cluster manager 141 may automatically create multiple cluster nodes and assign corresponding node names based on user's configuration inputs.

In some embodiments, the cluster manager 141 may automatically generate unique configuration values 215 for configuring the cluster nodes 150 during the batch-configuring process. For example, the cluster configuration manager 141 may configure the cluster nodes 150 using a set of unique IP addresses. The set of unique IP addresses may be automatically generated by the cluster configuration client 120 or the cluster manager 141. Alternatively, the cluster configure client 120 may provide GUI elements 211 to allow a user manually supplying the set of IP addresses, and transmit these IP addresses as configuration values 215 to the cluster manager 141 for batch-configuration 240. After the configuration values 215 are created, the cluster configuration client 120 and/or the cluster manager 141 may validate these configuration values 215 for any error or redundancy. If one of the configuration values 215 is found to be invalid or error, the cluster configuration client 120 and/or the cluster manager 141 may generate a new and valid configuration value to replace the invalid one.

Figure 3:
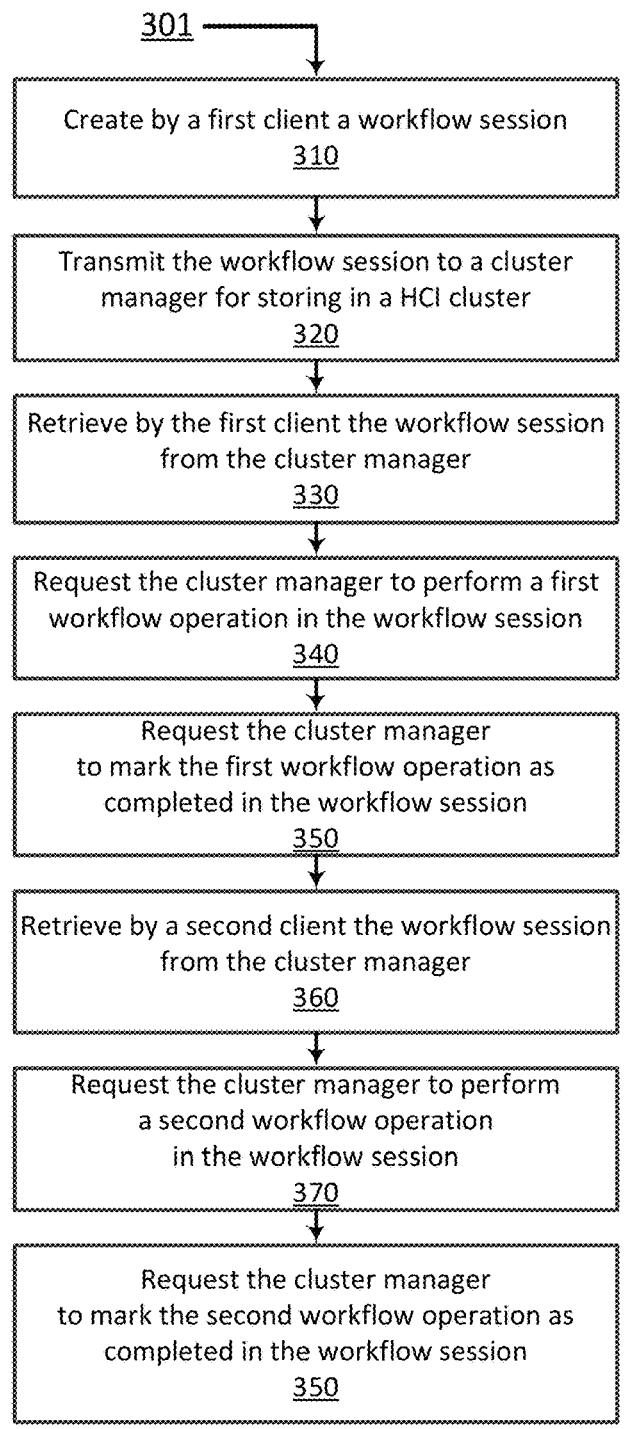
FIG. 3 shows a flow diagram illustrating a process for configuring a HCI cluster managed by a cluster manager; all arranged in accordance to certain embodiments of the present disclosure.

In some embodiments, a workflow for configuring the network of a single cluster node may include the following workflow operations: creating distributed switches; creating distributed port groups for the required services (e.g. vMotion, VSAN); creating VMkernel network adapters on each node for each service required; attaching VMkernel adapters to distributed port groups; configuring all objects with sensible default settings (plus the option for user-defined settings such as IP addressing); and auto-filling for IP addresses in a subnet. In this case, the cluster manager 141 may use this workflow for the batch-configuring of multiple cluster nodes with one invocation of these workflow operations by the cluster configuration client 120. This approach may ensure a consistency of the network topology even when the HCI cluster is extended with additional nodes, and may quickly raising alarms (validation errors) when topology consistency is compromised FIG. 3 shows a flow diagram illustrating a process for configuring a HCI cluster managed by a cluster manager, according to one or more embodiments of the present disclosure. The processes 301 may set forth various functional blocks or actions that may be described as processing steps, functional operations, events, and/or acts, which may be performed by hardware, software, and/or firmware.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 310, a HCI cluster may include a cluster manager. A first cluster configuration client may be configured to interact with the cluster manager in order to manage and configure the HCI cluster. In some embodiments, the first cluster configuration client may create a workflow session based on a workflow. The workflow session includes a plurality of workflow operations. A first workflow operation selected from the plurality of workflow operations is marked as incomplete;

At block 320, the first cluster configuration client may transmit the workflow session to the cluster manager for storing the workflow session in a workflow database located in the HCI cluster.

At block 330, the first cluster configuration client may subsequently interact with the cluster manager to retrieve the workflow session from a workflow database in the HCI cluster.

At block 340, in response to a user activation, the first cluster configuration client may transmit to the cluster manager a request to invoke the first workflow operation in the HCI cluster. Based on this request, the cluster manager may be configured to perform the first workflow operation by batch-configuring a plurality of nodes in the HCI cluster.

In some embodiments, the first workflow operation may include a set of tasks for configuring the plurality of nodes. The cluster manager may perform the batch-configuring of the plurality of nodes by creating each of the plurality of nodes based on the set of tasks, and assigning a corresponding configuration value for each of the plurality of nodes. Afterward, the cluster manager may configure each of the plurality of nodes using a corresponding configuration value selected from the set of configuration values.

In some embodiments, the first cluster configuration client or the cluster manager may generate the set of configuration values corresponding to the plurality of nodes. In response to a determination that one of the set of configuration values is invalid, the first cluster configuration client may adjust the invalid configuration value with a valid configuration value.

At block 350, in response to a determination that the first workflow operation is completed, the first cluster configuration client may request the cluster manager to mark the first work operation in the workflow session as completed, and store the updated workflow session in the workflow database of the HCI cluster.

At block 360, a second cluster configuration client may retrieve via the cluster manager the workflow session stored in the HCI cluster. In the workflow session, a second workflow operation subsequent to the first workflow operation in the plurality of workflow operations is marked as incomplete.

At block 370, the second cluster configuration client may transmit to the cluster manager a second request to invoke the second workflow operation. Based on this second request, the cluster manager may be configured to perform the second workflow operation by batch-configuring the plurality of nodes in the HCI cluster.

At block 380, in response to a determination that the second workflow operation is completed, the second cluster configuration client may request the cluster manager to mark the second workflow operation in the workflow session as completed and store the workflow session in the workflow database of the HCI cluster. In some embodiments, the cluster manager is configured to perform the first workflow operation at block 340 and the second workflow operation at block 370 in parallel.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium," as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

It will be understood that although the terms "first," "second," "third" and so forth are used herein to describe various elements, these elements should not be limited by these terms. These terms are only used to distinguish one element from another. For example, within the scope of the present disclosure, a first element may be referred to as a second element, and similarly a second element may be referred to as a first element. As used herein, the term "and/or" includes any and all combinations of one or more of the associated listed items.

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for configuring a hyper-converged infrastructure (HCI) cluster managed by a cluster manager, the method comprising:
  creating, by a first cluster configuration client, a workflow session based on a workflow;
  transmitting, by the first cluster configuration client, the workflow session to the cluster manager for storing the workflow session in the HCI cluster;
  retrieving, by the first cluster configuration client including an application window with a plurality of graphic user interface elements, the workflow session from the cluster manager via a network, wherein the workflow session includes a plurality of workflow operations, and a first workflow operation selected from the plurality of workflow operations is marked as incomplete, and the cluster manager is configured to create, adjust, and configure a plurality of nodes in the HCI cluster supported by a plurality of hosts;
  retrieving, by a second cluster configuration client different from the first cluster configuration client, the workflow session from the cluster manager, wherein a second workflow operation in the plurality of workflow operations is different from the first workflow operation and marked as incomplete;
  transmitting, by the first cluster configuration client to the cluster manager, a first request to invoke the first workflow operation, wherein the cluster manager is configured to perform the first workflow operation by batch-configuring the plurality of nodes in the HCI cluster;
  transmitting, by the second cluster configuration client to the cluster manager, a second request to invoke the second workflow operation;
  in response to a determination that the first workflow operation is completed, requesting the cluster manager, by the first cluster configuration client, to mark the first workflow operation in the workflow session as completed; and
  in response to a determination that the second workflow operation is completed, requesting the cluster manager, by the second cluster configuration client, to mark the second workflow operation in the workflow session as completed.

2. The method of claim 1, wherein the first workflow operation includes a set of tasks for configuring the plurality of nodes, and the batch-configuring of the plurality of nodes comprises:
  creating each of the plurality of nodes based on the set of tasks; and
  assigning a corresponding configuration value for each of the plurality of nodes.

3. The method of claim 2, wherein the assigning of the corresponding configuration value further comprises:
  receiving a set of configuration values corresponding to the plurality of nodes; and
  configuring each of the plurality of nodes using a corresponding configuration value selected from the set of configuration values.

4. The method of claim 3, wherein the receiving of the set of configuration values comprises:
  generating, by the first cluster configuration client, the set of configuration values; and
  in response to a determination that one of the set of configuration values is invalid for including an error, adjusting the invalid configuration value with a valid configuration value.

5. The method of claim 1,
wherein the second workflow operation is subsequent to the first workflow operation;
and the cluster manager is configured to perform the second workflow operation by batch-configuring the plurality of nodes in the HCI cluster.

6. The method of claim 5, wherein the cluster manager is configured to perform the first workflow operation and the second workflow operation in parallel.

7. A non-transitory computer-readable storage medium that includes a set of instructions which, in response to execution by one or more processors for cluster configuration clients including a first configuration client and a second configuration client different from the first configuration client, cause the processors to perform a method of configuring a hyper-converged infrastructure (HCI) cluster, wherein the method comprises:
creating, by the first cluster configuration client, a workflow session based on a workflow;
transmitting, by the first cluster configuration client, the workflow session to the cluster manager for storing the workflow session in the HCI cluster;
displaying, by the first cluster configuration client including an application window, a set of graphic user interface (GUI) elements based on the workflow session in the application window, wherein the set of GUI elements correspond to a plurality of workflow operations in the workflow session, and a first workflow operation and a second workflow operation selected from the plurality of workflow operations are marked as incomplete, and the cluster manager is configured to create, adjust, and configure a plurality of nodes in the HCI cluster supported by a plurality of hosts; and
transmitting, by the first cluster configuration client to the cluster manager via a network, a first invocation to invoke the first workflow operation, wherein the cluster manager is configured to perform the first workflow operation by batch-configuring the plurality of nodes in the HCI cluster, and the cluster manager marks the first workflow operation in the workflow session as completed; and
transmitting, by the second cluster configuration client to the cluster manager, a second invocation to invoke the second workflow operation, and the cluster manager marks the second workflow operation in the workflow session as completed.

8. The non-transitory computer-readable storage medium of claim 7, wherein the method further comprises:
retrieving, by the second cluster configuration client, the workflow session from the cluster manager, wherein the workflow session is previously processed by the first cluster configuration client.

9. The non-transitory computer-readable storage medium of claim 7, wherein the method further comprises:
retrieving, by the second cluster configuration client, the workflow session from the cluster manager, wherein the workflow session is concurrently processed by the first cluster configuration client.

10. The non-transitory computer-readable storage medium of claim 7, wherein the first workflow operation includes a set of tasks for configuring the plurality of nodes, and the batch- configuring of the plurality of nodes comprises:
creating each of the plurality of nodes based on the set of tasks; and
assigning a corresponding configuration value for each of the plurality of nodes.

11. The non-transitory computer-readable storage medium of claim 10, wherein the assigning of the corresponding configuration value further comprises:
receiving a set of configuration values corresponding to the plurality of nodes; and
configuring each of the plurality of nodes using a corresponding configuration value selected from the set of configuration values.

12. The non-transitory computer-readable storage medium of claim 11, wherein the receiving of the set of configuration values comprises:
generating, by the first cluster configuration client, the set of configuration values; and
in response to a determination that one of the set of configuration values is invalid for including an error, adjusting the invalid configuration value with a valid configuration value.

13. A computing system for configuring a hyper-converged infrastructure (HCI) cluster, the computing system comprising:
a plurality of cluster configuration clients including a first configuration client and a second configuration client different from the first configuration client; and
a cluster manager for managing the HCI cluster,
wherein the first cluster configuration client includes an application window with a plurality of graphic user interface elements and is configured to
create a workflow session based on a workflow;
transmit the workflow session to the cluster manager for storing the workflow session in the HCI cluster;
retrieve the workflow session from the cluster manager via a network, wherein the workflow session includes a plurality of workflow operations, and a first workflow operation selected from the plurality of workflow operations is marked as incomplete, and the cluster manager is configured to create, adjust, and configure a plurality of nodes in the HCI cluster supported by a plurality of hosts,
transmit to the cluster manager a first request to invoke the first workflow operation, wherein the cluster manager is configured to perform the first workflow operation by batch-configuring the plurality of nodes in the HCI cluster,
in response to a determination that the first workflow operation is completed, request the cluster manager to mark the first workflow operation as completed; and
wherein the second cluster configuration client is configured to
retrieve the workflow session from the cluster manager, wherein a second workflow operation selected from the plurality of workflow operations is different from the first workflow operation and marked as incomplete,
transmit to the cluster manager a second request to invoke the second workflow operation, and
in response to a determination that the second workflow operation is completed, request the cluster manager to mark the second workflow operation as completed.

14. The computing system of claim 13, wherein the first workflow operation includes a set of tasks for configuring the plurality of nodes, and the batch-configuring of the plurality of nodes comprises:
creating each of the plurality of nodes based on the set of tasks; and assigning a corresponding configuration value for each of the plurality of nodes.

15. The computing system of claim 14, wherein the assigning of the corresponding configuration value further comprises:

receiving a set of configuration values corresponding to the plurality of nodes; and configuring each of the plurality of nodes using a corresponding configuration value selected from the set of configuration values.

16. The computing system of claim 13, wherein the second workflow operation is subsequent to the first workflow operation and the cluster manager is configured to perform the second workflow operation by batch-configuring the plurality of nodes in the HCI cluster.

17. The computing system of claim 16, wherein the cluster manager is configured to perform the first workflow operation and the second workflow operation in parallel.

* * * * *